Nov. 22, 1927. 1,649,902

J. V. JOHNSON

BIRD CAGE

Filed Jan. 20, 1927

Inventor
JOHN V. JOHNSON.
Geo Stevens
Attorney

Patented Nov. 22, 1927.

1,649,902

UNITED STATES PATENT OFFICE.

JOHN VICTOR JOHNSON, OF DULUTH, MINNESOTA.

BIRD CAGE.

Application filed January 20, 1927. Serial No. 162,277.

This invention relates to bird cages, the principal object being to provide a more conveniently cleaned and sanitary bird cage than those in common use.

Other objects and advantages of the invention will appear in the further description thereof.

Referring now to the accompanying drawing, forming part of this application, wherein like reference characters indicate like parts:

Figure 1:
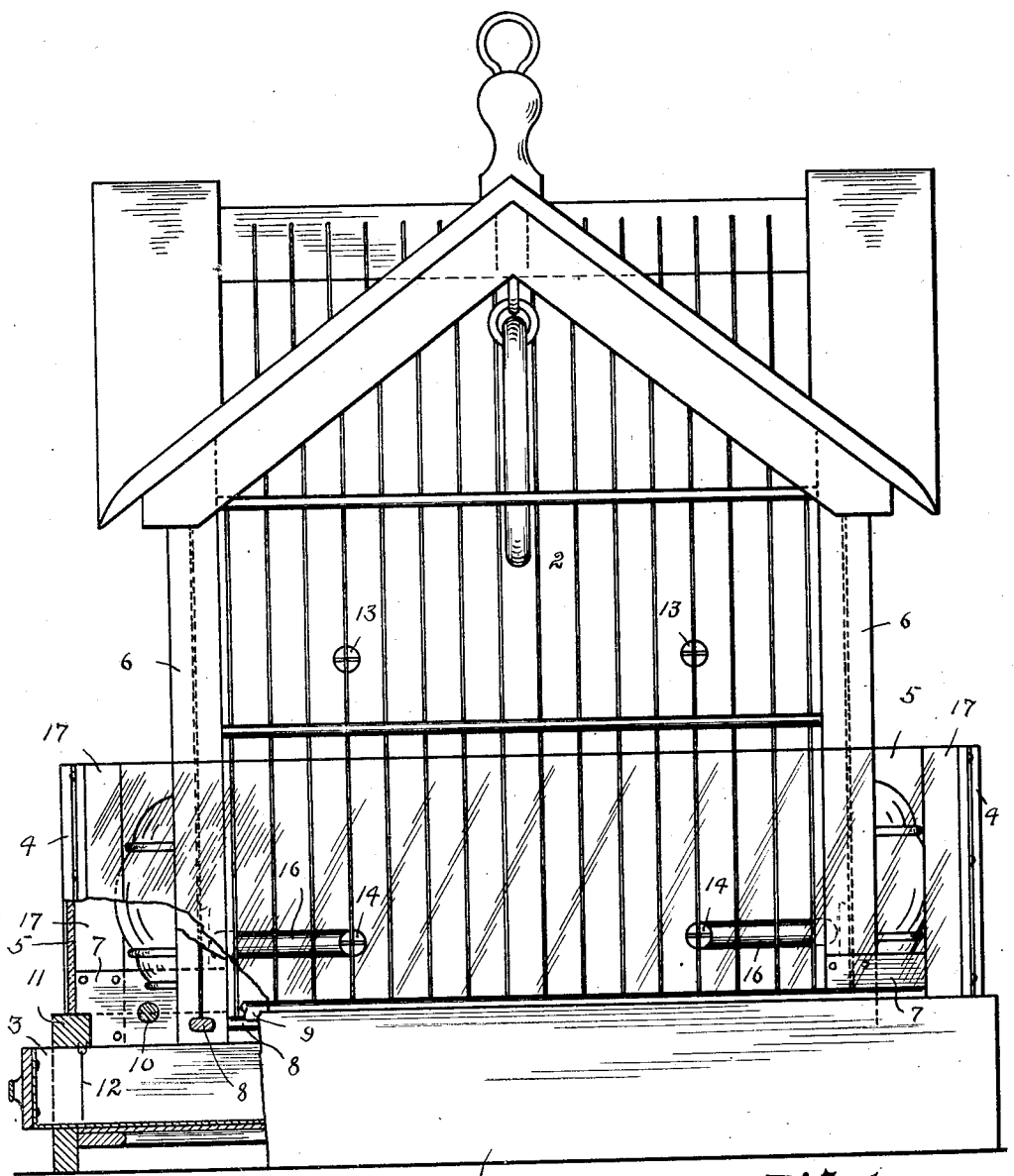
Figure 1 is a side elevation of a bird cage embodying the invention, the same being broken away at one corner thereof for a better comprehension of its construction.

1 represents a shallow, rectangularly shaped, receptacle which forms the base of the bird cage. This receptacle is open in its upper side or top, and the cage proper, illustrated at 2, is suspended over the receptacle and rigidly attached thereto. One wall or side edge of the base 1 is open for the reception of the floor drawer 3, the latter being readily removable for convenient cleaning of the cage.

At the corners of the base 1 are upright members or corner posts 17 carrying the butterfly shaped upright metal corner strips 4 for the reception of the glass shields 5, of which there are four, one upon either side of the cage and spaced therefrom, they being for the purpose of preventing refuse from the cage being scattered about as is common with the ordinary bird cage, it being well known that a bird in eating seed or flying about fouls the premises adjacent its cage. These porch walls or shields being made of glass in no wise interfere with the view of the bird or the latter's view from the cage, they also act as a shield to the bird, particularly when in the lower portion of the cage and when the latter happens to be placed in a draft, which is well known to be objectionable to a confined bird.

Figure 2:
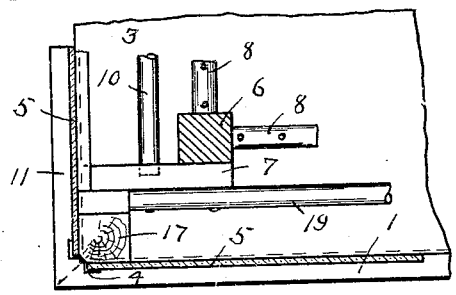
Figure 2 is a plan view, showing the corner of the cage in section.
Figure 3:
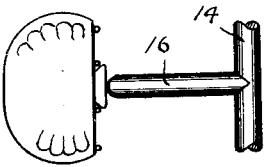
Figure 3 is a plan view of the improved arrangement of feeding roost or perch.

The corners of the cage are illustrated at 6, and in the instant case are of wood, though it is to be understood and quite obvious that the entire cage may be of metal if preferred. The supporting means for the cage proper in this case comprises the short wooden blocks 7 securely fastened to the upright posts 17 on the base 1 at one end, and to the posts 6 of the bird cage at the other end, thus acting as a suspension support for the cage. Longitudinally of the space intermediate of the rails 8 of the cage and the side walls of the base are installed the rails 9—9 on two opposite sides and like rails 10—10 on the other two sides, the ends of the rails being mounted within suitable holes in the blocks 7 and the ends of the former nailed or otherwise attached to the sides of said blocks, as clearly illustrated in Figure 2 of the drawings. These rails are for the purpose of barring exit of the bird through the openings formed between the outer edges of the porch or extension and the edges of the cage, it being deemed essential that the shields 5 are spaced some distance from the sides of the cage to function in the most desirable manner.

As before stated, the drawer 3 for cleaning the cage is preferably substantially the full size of the base and is made to be readily removed wholly therefrom and is constructed of thin material such as tin or the like, it having a wooden front terminal for convenience in manipulating same. Within the drawer and suspended from the front cross-piece 11 of the base is a drop door 12 also of sheet tin, it being so suspended as to in no manner interfere with the entire removal of the drawer, but at all times hanging in upright position to prevent the escape of the bird when the drawer is wholly removed.

13 and 14 represent the bird perches in the cage which are provided with vertical slots for engagement with the wires of the cage as is common, and the perches 14 are spaced some distance away from the entrance to the seed cups 15, each perch 14 having rigidly fixed thereto a laterally extending section of perch 16 which has no support other than its attachment to the main perch 14 and is for the purpose of providing convenience for the bird when feeding, so that it may readily step back and forth from the main perch to this lateral section of perch without turning when close to the sides of the cage and thus damaging its tail feathers.

What I claim and desire to secure by Letters Patent, is:

The combination with a bird cage, of a base therefor comprising an open topped receptacle extending beyond the cage upon all sides thereof, means for suspending the cage over the receptacle, a cleaning drawer substantially the full size of the receptacle and slidable in respect thereto, a gravity door for control of the space occupied by the drawer when the latter is removed, means for preventing the escape of a bird through the space intermediate of the base of the cage and the edges of the receptacle, and upright removable shields supported about the edges of the base for directing waste material thrown from the cage through the opening intermediate of the latter and the edges of the receptacle.

In testimony whereof I affix my signature.

JOHN VICTOR JOHNSON.